United States Patent

Horiuchi et al.

[11] Patent Number: 5,813,434
[45] Date of Patent: Sep. 29, 1998

[54] EVAPORATIVE FUEL PROCESSING DEVICE

[75] Inventors: Masaaki Horiuchi; Takeaki Nakajima; Kazumi Yamazaki, all of Wako, Japan

[73] Assignee: Honda Giken Kogyo Kabushiki Kaisha, Tokyo, Japan

[21] Appl. No.: 729,918

[22] Filed: Oct. 11, 1996

[30] Foreign Application Priority Data

Oct. 13, 1995 [JP] Japan .................................. 7-265888

[51] Int. Cl.$^6$ .................................................. F16K 24/04
[52] U.S. Cl. .......................................... 137/587; 137/202
[58] Field of Search .................................... 137/587, 202

[56] References Cited

U.S. PATENT DOCUMENTS

| | | | |
|---|---|---|---|
| 5,443,561 | 8/1995 | Sakata et al. | 137/587 X |
| 5,462,100 | 10/1995 | Covert et al. | 137/43 X |
| 5,474,048 | 12/1995 | Yamazaki et al. | 137/587 X |
| 5,529,086 | 6/1996 | Kasugai et al. | 137/587 X |
| 5,584,278 | 12/1996 | Satoh et al. | 137/587 X |
| 5,647,334 | 7/1997 | Miller | 123/520 |
| 5,669,361 | 9/1997 | Weissinger et al. | 137/587 X |

FOREIGN PATENT DOCUMENTS 7-189823   7/1995   Japan .

*Primary Examiner*—Gerald A. Michalsky
*Attorney, Agent, or Firm*—Nikaido, Marmelstein, Murray & Oram LLP

[57] ABSTRACT

An on-off valve 30 is mounted in an intermediate portion of a first evaporative fuel conduit 24 for passing an evaporative fuel within a fuel tank 21 to a canister C. The on-off valve 30 is opened when refueling. A float valve 28 is mounted at a lower end of the first evaporative fuel conduit 24 and closed by rising of the liquid level in the fuel tank 21. A two-way valve 40 and a second float valve 29 are mounted in an intermediate portion and a lower end of a second evaporative fuel conduit 25 which permits the fuel tank 21 and the canister C to be put into communication with each other during non-refueling. By putting the first and second evaporative fuel conduits 24 and 25 into communication with each other by a communication passage 27, the internal pressure in a portion 24a of the first evaporative fuel conduit 24, between the on-off valve 30 and the second float valve 28, is equalized to the internal pressure in the fuel tank 21, thereby preventing the first float valve 28 from being stuck in a closed position.

4 Claims, 4 Drawing Sheets

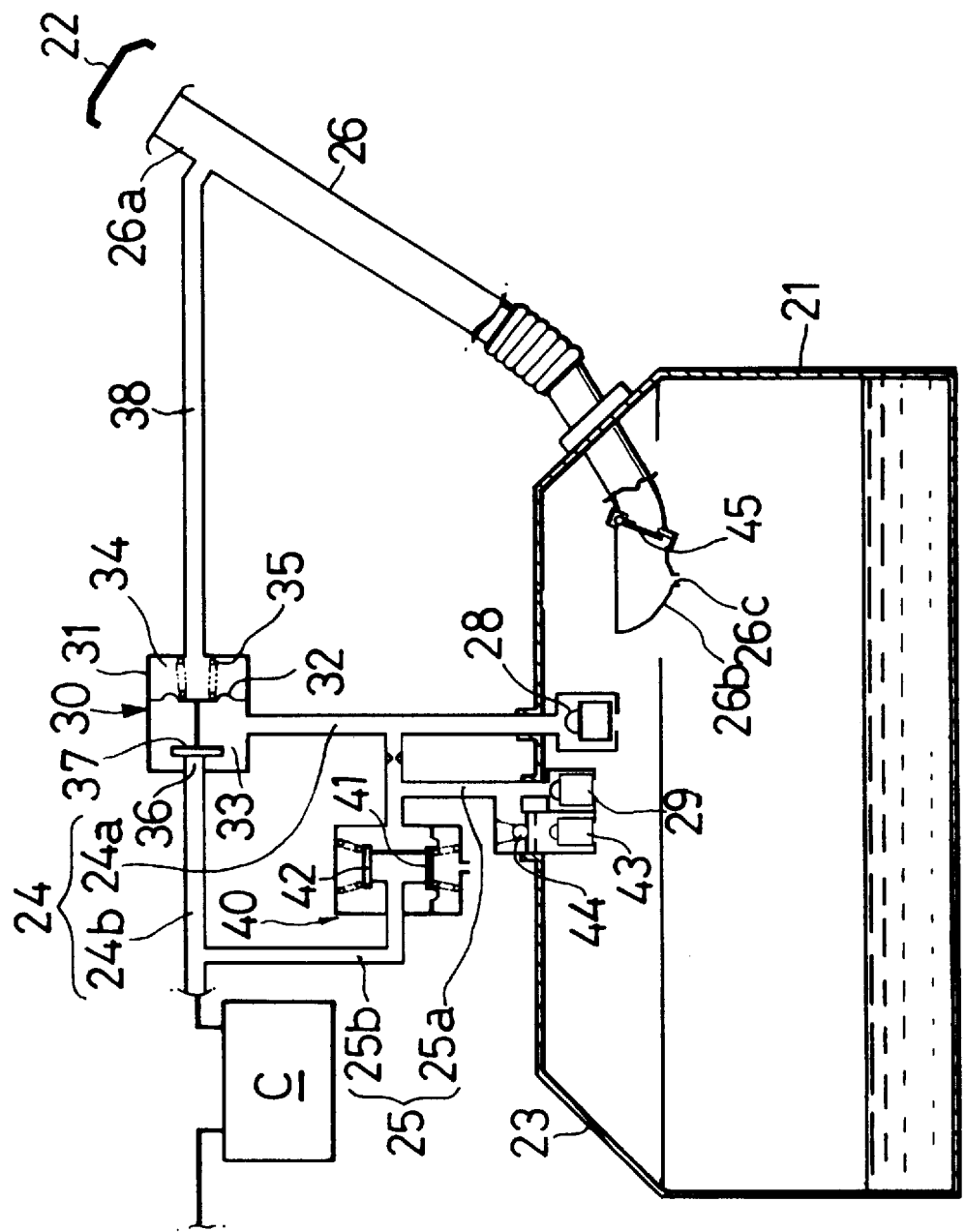

EVAPORATIVE FUEL PROCESSING DEVICE

DETAILED DESCRIPTION OF THE INVENTION

1. Field of the Invention

The present invention relates to an evaporative fuel processing device including a float valve for cutting-off the communication between an evaporative fuel conduit and a fuel tank.

2. Background of the Invention

An evaporative fuel processing device is already known, for example, from Japanese Patent Application Laid-open No. 7-189823.

The above known evaporative fuel processing device includes an evaporative fuel conduit which connects the fuel tank and the canister to each other, so that an evaporative fuel within the fuel tank is passed to the canister by opening an on-off valve by an increase in internal pressure in the fuel tank caused by the refueling. The on-off valve is incorporated in an intermediate portion of the evaporative fuel conduit. The fuel is prevented from entering the evaporative fuel conduit by closing a float valve, mounted at a lower end of the evaporative fuel conduit, by a rising of the liquid level in the fuel tank caused by the refueling.

The above known system has the following problem: When the float valve is closed by refueling, the evaporative fuel conduit between the float valve and the on-off valve is tightly closed. For this reason, particularly when the internal pressure in the tightly closed evaporative fuel conduit becomes negative due to a reduction in temperature or the like, the float valve can become stuck in the closed position which causes an operation failure.

SUMMARY OF THE INVENTION

It is an object of the present invention to prevent the float valve from staying in the closed position which was caused by the rising of the liquid level in the fuel tank to cut off the communication between the evaporative fuel conduit and the fuel tank.

To achieve the above object, according to a first aspect of the present invention, there is provided an evaporative fuel processing device comprising, a fuel tank, a canister for adsorbing evaporative fuel, a first evaporative fuel conduit for guiding the evaporative fuel in the fuel tank to the canister during refueling, an on-off valve incorporated in an intermediate portion of the first evaporative fuel conduit and opened at the time of refueling, a float valve which is closed by rising of the liquid level in the fuel tank to cut-off the communication between the first evaporative fuel conduit and the fuel tank, and a second evaporative fuel conduit which permits the fuel tank and the canister to be put into communication with each other during non-refueling. The first evaporative fuel conduit between the on-off valve and the float valve is put into communication with the second evaporative fuel conduit through a communication passage.

According to a second aspect of the present invention, in addition to the first aspect, the communication passage is provided with a constriction.

According to a third aspect of the present invention, in addition to the second aspect, a check valve is incorporated in the second evaporative fuel conduit at a location between the canister and the communication passage.

BRIEF DESCRIPTION OF THE DRAWINGS

FIG. 4 is a view similar to FIG. 1, but illustrating a modification of the present invention.

DESCRIPTION OF THE PREFERRED EMBODIMENTS

The present invention will now be described by way of an embodiment with reference to the accompanying drawings.

Figure 1:
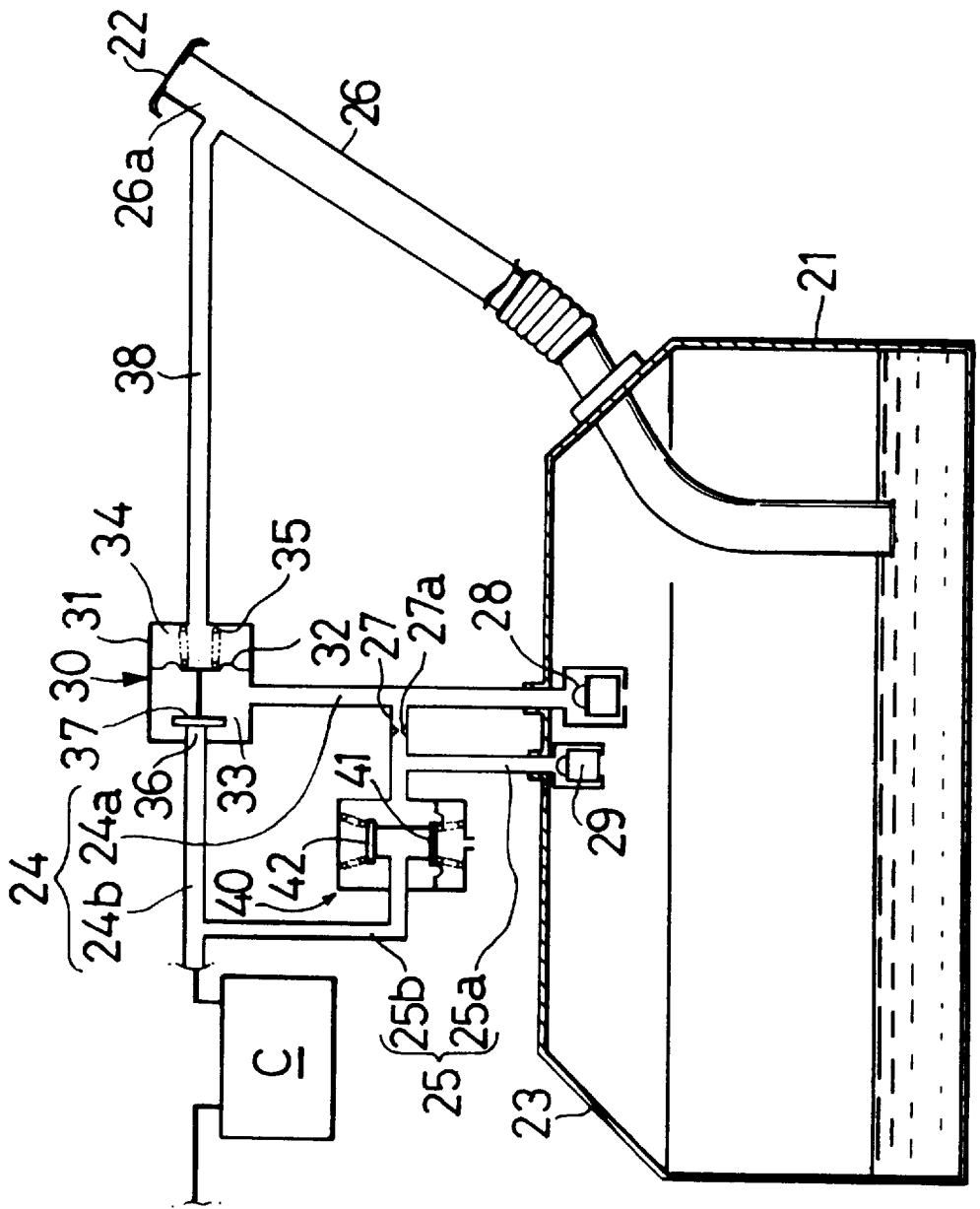
FIG. 1 is a view showing an evaporative fuel processing device in a non-refueling state.

As shown in FIG. 1, first and second evaporative fuel conduits 24 and 25 extend upwards to discharge an evaporative fuel generated within a fuel tank 21 carried in a vehicle. The conduits 24 and 25 are connected at their lower ends to a bulged portion 23 provided on a ceiling plate of the fuel tank 21. A refueling pipe 26 for refueling of the fuel tank 21 is also connected to the bulged portion 23. An inlet portion 26a, at an upper end of the refueling pipe 26, is openable and closable by a cap 22. A first float valve 28 and a second float valve 29 are mounted at lower ends of the first and second evaporative fuel conduits 24 and 25 and disposed within the bulged portion 23, so that they are closed when the fuel level in the fuel tank 21 rises.

The first evaporative fuel conduit 24 is connected to a canister C filled with an adsorbent (not shown) for adsorbing the evaporative fuel. An on-off valve 30 is incorporated in the intermediate portion of the first evaporative fuel conduit 24 and is opened when refueling.

A peripheral edge of a diaphragm 32 is clamped in a housing 31 of the on-off valve 30. The inside of the housing 31 is divided by the diaphragm 32 into a valve chamber 33 leading to a portion 24a of the first evaporative fuel conduit 24 on the side of the fuel tank 21, and a spring chamber 34. A spring 35 for biasing the diaphragm 32 toward the valve chamber 33 is accommodated in the spring chamber 34. A valve member 37 is accommodated in the valve chamber 33 and capable of opening and closing a valve bore 36 leading to a portion 24b of the first evaporative fuel conduit 24 on the side of the canister C. The valve member 37 is connected to the diaphragm 32. The spring chamber 34 communicates with the inlet portion 26a at the upper end of the refueling pipe 26 through a communication pipe 38.

The second evaporative fuel conduit 25 connecting the fuel tank 21 and the canister C to each other includes a two-way valve 40 between its portion 25a on the side of fuel tank 21 and its portion 25b on the side of the canister C. The two-way valve 40 includes a positive pressure valve 41 adapted to be opened when the internal pressure in the fuel tank 21 is increased by a predetermined value higher than atmospheric pressure, thereby permitting the fuel tank 21 and the canister C to communicate with each other. The two-way valve 40 also includes a negative pressure valve 42 adapted to be opened when the internal pressure in the fuel tank 21 is decreased lower than the internal pressure in the canister C by a predetermined value, thereby permitting the fuel tank 21 and the canister C to communicate with each other.

The portion 24a of the first evaporative fuel conduit 24 on the side of the fuel tank 21 and the portion 25a of the second evaporative fuel conduit 25 on the side of the fuel tank 21 are connected to each other by a communication passage 27 having a constriction 27a provided in the middle thereof.

The operation of the embodiment of the present invention having the above-described arrangement will be described below.

In a state in which the cap 22 of the refueling pipe 26 has been closed, the valve chamber 33 and the spring chamber 34 of the on-off valve 30 are in communication with each other through the communication pipe 38, the refueling pipe 26, an internal space in the fuel tank 21 and the first evaporative fuel conduit 24. Therefore, the valve member 37 closes the valve bore 36 by a resilient force of the spring 35, and the communication between the fuel tank 21 and the canister C through the first evaporative fuel conduit 24 is cut off. In this state, the positive pressure valve 41 or the negative pressure valve 42 of the two-way valve 40 depending upon an increase or a decrease in internal pressure in the fuel tank 21 is opened to put the fuel tank 21 and the canister C into communication with each other.

Figure 2:
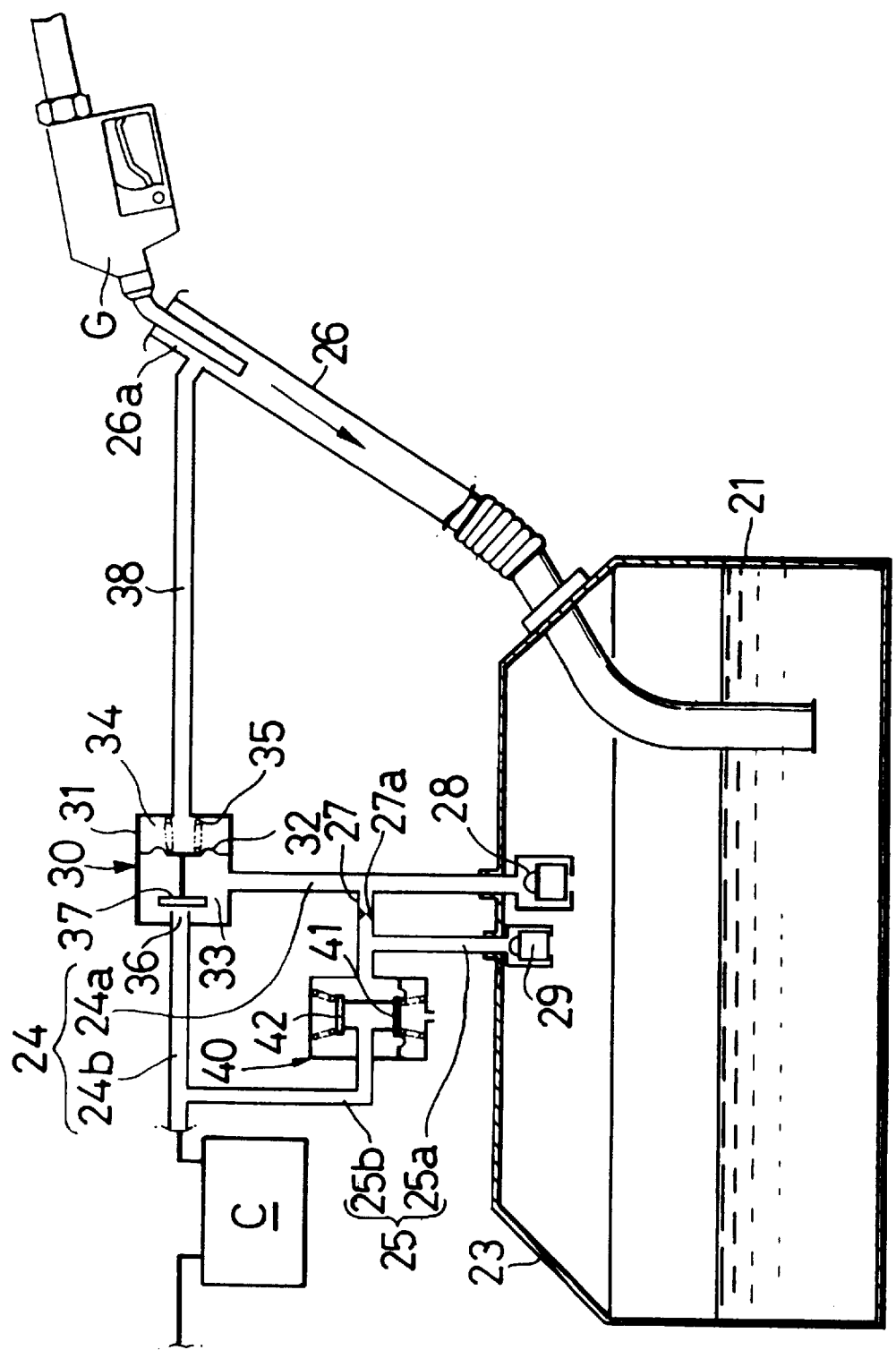
FIG. 2 is a view showing the evaporative fuel processing device in a refueling state.

As shown in FIG. 2, when the cap 22 is opened and the nozzle of a refueling gun G is inserted into the inlet portion 26a of the refueling pipe 26 to refuel the fuel tank 21, the spring chamber 34 in the on-off valve 30 communicates with the atmosphere through the communication pipe 38 and the inlet portion 26a of the refueling pipe 26. As a result, the internal pressure in the spring chamber 34 is equal to the atmospheric pressure. On the other hand, the internal pressure in the fuel tank 21 is increased by the refueling. Hence, the internal pressure in the valve chamber 33 is higher than atmospheric pressure. When the differential pressure exceeds the resilient force of the spring 35, the diaphragm 32 is displaced in a direction to reduce the volume of the spring chamber 34. In response to this displacement, the valve member 37 opens the valve bore 36 to put the fuel tank 21 and the canister C into communication with each other. As a result, the fuel can be supplied into the fuel tank 21, and the evaporative fuel can be supplied into the canister C through the first evaporative fuel conduit 24 and the on-off valve 30 and thus, can be prevented from being released to the atmosphere.

Figure 3:
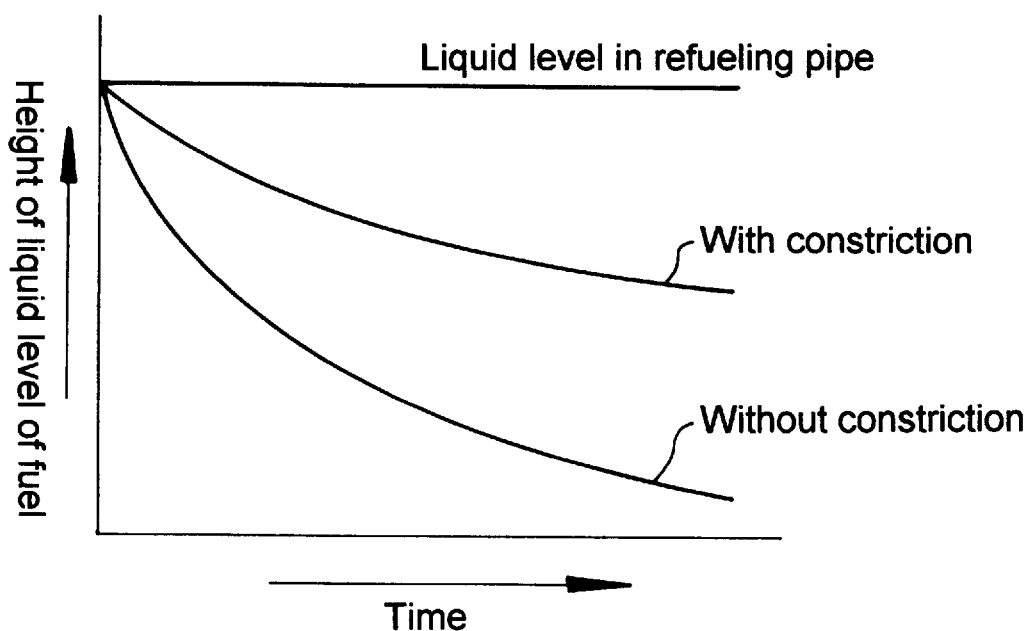
FIG. 3 is a graph showing the variation in height of the level of fuel in a refueling pipe.

When the level of the fuel within the fuel tank 21 rises, the first float valve 28 is closed to close the lower end of the first evaporative fuel conduit 24. Therefore, the internal pressure in the fuel tank 21 is increased. Hence, it is difficult for the fuel level in the fuel tank 21 to rise, but the fuel level in the refueling pipe 26 rises. As a result, the tip end of the refueling gun G is submerged into the fuel. Therefore, the automatic stopping device of the refueling gun G is operated to stop the refueling. Thereafter, the internal pressure in the fuel tank 21 is transmitted via the portion 25a of the second evaporative fuel conduit 25 on the side of the fuel tank 21 and the communication passage 27 to urge and open the valve member 37 of the on-off valve 30. Then, the internal pressure escapes from the fuel tank toward the canister C. At this time, it is difficult for the internal pressure in the fuel tank 21 to escape toward the canister C due to the function of the constriction 27a provided in the communication passage 27. Hence, the level of the fuel in the refueling pipe 26 is prevented from being lowered suddenly, as shown in FIG. 3. Thus, the person who is refueling the fuel tank does not mistakenly believe that the fuel tank 21 is still not in a filled-up state and starts refueling. Thus, over refueling can be prevented.

When the vehicle has been overturned, both the first and second float valves 28 and 29 are closed to prevent the fuel from flowing out of the fuel tank 21.

When the refueling of the fuel tank 21 has been completed in the above manner and the cap 22 has been closed, the portion 24a of the first evaporative fuel conduit 24, connecting the first float valve 28 in the closed state and the on-off valve 30 in the closed state, communicates with the internal space in the fuel tank 21 through the communication passage 27 and the portion 25a of the second evaporative fuel conduit 25. Therefore, the internal pressure in the portion 24a of the first evaporative fuel conduit 24 is equal to the internal pressure in the fuel tank 21, and the first float valve 28 is prevented from being affixed or stuck to a valve seat. Particularly, if the first float valve 28 is left closed in a high-temperature state, the internal pressure in the portion 24a of the first evaporative fuel conduit 24 is reduced upon dropping of the temperature, whereby a phenomenon of affixing of the first float valve 28 to a valve seat is likely to happen. However, the generation of this phenomenon can be reliably prevented by the function of the communication passage 27.

When the cap 22 of the refueling pipe 26 is in the closed state, the internal pressure in the fuel tank 21 is limited by an opening pressure for the positive pressure valve 41 of the two-way valve 40. This opening pressure for the positive pressure valve 41 (for example, 13 mmHg) is set higher than that (for example, 5 mmHg) for the on-off valve 30. Therefore, when the cap 22 of the refueling pipe 26 is opened at the time of refueling, so that the pressure in the spring chamber 34 in the on-off valve 30 reaches atmospheric pressure, the diaphragm 32 is displaced by the internal pressure in the fuel tank 21. In response to this displacement, the valve member 37 opens the valve bore 36 to put the fuel tank 21 and the canister C into communication with each other through the first evaporative fuel conduit 24. Thus, the internal pressure in the fuel tank 21 is lowered. Hence, even if the lower end of the refueling pipe 26 is submerged under the fuel level, refueling can be performed without hindrance. Even if the first float valve 28 is in the closed state when the cap 22 of the refueling pipe 26 is opened, the internal pressure in the fuel tank 21 escapes through the portion 25a of the second evaporative fuel conduit 25 and the communication passage 27 toward the canister C without hindrance.

FIG. 4 illustrates a modification of the present invention. In this modification, a third float valve 43 and a check valve 44 are provided in addition to the second float valve 28. The check valve 44 permits the communication from the fuel tank 21 to the second evaporative fuel conduit 25 and limits the communication from the second evaporative fuel conduit 25 to the fuel tank 21. The third float valve 43 prevents the fuel from flowing out through the check valve 44, when the vehicle has overturned.

According to the modification, when the first float valve 28 is closed by the refueling of the fuel tank 21, the level of the fuel in the refueling pipe 26 rises, and the automatic stopping device of the refueling gun G is operated to stop the refueling. At this time, the second float valve 29 and the third float valve 43 are in their opened states. If a person who refuels supplies an additional amount of the fuel little by little after the level of the fuel in the refueling pipe 26 has been lowered due to the internal pressure in the fuel tank 21 escaping through the on-off valve 30 toward the canister C, the level of the fuel in the fuel tank 21 rises, and the second float valve 29 is soon closed. As a result, the internal pressure in the fuel tank 21 is limited by the opening pressure for the check valve 44 rather than the opening pressure for the positive pressure valve 41 of the two-way valve 40, so that the level of the fuel in the refueling pipe 26 is maintained at a higher position, whereby additional refueling cannot be conducted. At this time, refueling is finished.

To suppress the internal pressure at a lower level in the fuel tank 21 during non-refueling, it is necessary to set the opening pressure for the positive pressure valve 41 of the two-way valve 40 at a rather low level. However, if the opening pressure is so set, the internal-pressure in the fuel tank 21 forces open the positive pressure valve 41 and the internal pressure escapes toward the canister C. For this reason, there is a possibility that it is difficult for the level of the fuel in the refueling pipe 26 to rise, resulting in an occurrence of over refueling. However, the provision of the check valve 44 in the second evaporative fuel conduit 25 as in the modification of the present invention, ensures that even if the opening pressure for the positive pressure valve 41 is set at the rather low level, the internal pressure in the fuel tank 21 can be maintained at a rather high level, so that the level of the fuel in the refueling pipe 26 can be reliably raised to prevent the occurrence of over refueling.

A vessel-like fuel accumulation portion 26b having an opened upper surface is provided at the lower end of the refueling pipe 26. A small bore 26c is defined in a bottom surface of the fuel accumulation portion 26b. A check valve 45 is mounted at the lower end of the refueling pipe 26. The check valve 45 is normally in a closed state under the influence of gravity. When the fuel is supplied through the refueling pipe 26, the check valve 45 is urged and opened by the fuel.

When the cap 22 is opened at the time of refueling, the evaporative fuel within the fuel tank 21 is blocked by the check valve 45 and prevented from being released to the atmosphere through the refueling pipe 26. In addition, after refueling is started and the check valve 45 is opened, the evaporative fuel in the fuel tank 21 is blocked by the fuel accumulated in the fuel accumulation portion 26b and prevented from being released to the atmosphere through the refueling pipe 26. After completion of the refueling, the fuel accumulated in the fuel accumulation portion 26b is dropped through the small bore 26c, whereby the inside of the fuel tank 21 and the inside of the refueling pipe 26 communicate with each other.

The functions of the communication passage 27 and the constriction 27a in the modification are identical to those in the embodiment shown in FIGS. 1 to 3 and hence, a similar operation and effect to those in the embodiment can be exhibited.

As discussed above, according to a first aspect of the present invention, when the float valve is closed by the rising of the liquid level in the fuel tank caused by refueling, the first evaporative fuel conduit between the float valve and the on-off valve is put into communication with the inside of the fuel tank through the communication passage and the second evaporative fuel conduit. Hence, pressures on opposite sides of the float valve can not become equal to each other to cause an operation failure due to the float valve becoming stuck to a valve seat.

According to the second aspect of the present invention, the provision of the constriction in the communication passage ensures that after closing of the float valve, it is difficult for the internal pressure in the fuel tank to escape through the second evaporative fuel conduit, the communication passage, the first evaporative fuel conduit and the on-off valve. Thus, it is possible to prevent over refueling of the fuel into the fuel tank.

According to the third aspect of the present invention, the check valve opened by the rising of the internal pressure in the fuel tank is incorporated in the second evaporative fuel conduit at a location on the side of the canister from the communication passage. Thus, it is possible to prevent the escaping of the internal pressure in the fuel tank after closing of the float valve, by the check valve, and to effectively exhibit the effect of the constriction provided in the communication passage.

Although the embodiment of the present invention has been described in detail, it will be understood that the present invention is not limited to the above-described embodiments, and various modifications in design may be made without departing from the subject matter and scope of the invention.

What is claimed is:

1. An evaporative fuel processing device comprising:
   a fuel tank;
   a canister which absorbs evaporative fuel;
   a first evaporative fuel conduit which connects the fuel tank to the canister during refueling;
   an on-off valve located in an intermediate portion of the first evaporative fuel conduit between the fuel tank and the canister, said on-off valve being in an on position during refueling to open the first evaporative fuel conduit;
   a float valve provided at one end of said first evaporative fuel conduit, said float valve is closed by rising of the liquid level in the fuel tank to cut off the connection between the first evaporative fuel conduit and the fuel tank;
   a second evaporative fuel conduit which connects the fuel tank to the canister during non-refueling and which bypasses said on-off valve; and
   a communication passage which connects said first evaporative fuel conduit to said second evaporative fuel conduit at an intermediate location between the on-off valve and the float valve.

2. An evaporative fuel processing device according to claim 1, wherein said communication passage is provided with a constriction.

3. An evaporative fuel processing device according to claim 2, further including a check valve incorporated in the second evaporative fuel conduit at a location between the canister and the communication passage.

4. An evaporative fuel processing device according to claim 3, further comprising a second check valve provided in a refueling pipe.

* * * * *